No. 697,735. Patented Apr. 15, 1902.
G. B. MAGOUN.
CASTER.
(Application filed Aug. 31, 1900.)
(No Model.)

WITNESSES:

INVENTOR
Geo. B. Magoun
BY Kenyon & Kenyon
ATTORNEYS

THE NORRIS PETERS CO., PHOTO-LITHO., WASHINGTON, D. C.

UNITED STATES PATENT OFFICE.

GEORGE B. MAGOUN, OF BABYLON, NEW YORK, ASSIGNOR TO THE ACME BALL BEARING CASTER COMPANY, A CORPORATION OF NEW YORK.

CASTER.

SPECIFICATION forming part of Letters Patent No. 697,735, dated April 15, 1902.

Application filed August 31, 1900. Serial No. 28,674. (No model.)

*To all whom it may concern:*

Be it known that I, GEORGE B. MAGOUN, a citizen of the United States, and a resident of Babylon, in the county of Suffolk, State of New York, have invented certain new and useful Improvements in Casters, of which the following is a specification.

My invention relates to furniture-casters, and particularly to that type of caster in which the load is supported upon a ball or sphere which is free to rotate in all directions. One objection to this type of caster is found in the fact that owing to the small bearing-surface afforded by the ball it embeds itself more or less in the floor or other surface upon which it rolls, thus causing considerable friction in the operation of the caster and also an undesirable marking of such of the surfaces upon which the casters are used as are polished and unprotected.

My invention has for an object to overcome the above objection to ball-casters, this object being accomplished by providing an auxiliary bearing-surface between the ball and the floor or other surface, said auxiliary bearing-surface in effect forming a track for the ball to roll upon.

Other objects of my invention are to provide an auxiliary track of such form and construction as will reduce the friction in the caster to a minimum, also one which will automatically center itself and retain its proper place in the caster, and to otherwise improve this type of caster and render the same more practical.

My invention consists in the novel parts and improvements and combinations hereinafter more fully set forth.

The accompanying drawings, which are referred to herein and form a part hereof, illustrate one embodiment of my invention and serve in connection with the description herein to explain the principles thereof and the best mode in which I have contemplated applying these principles.

Figure 1:
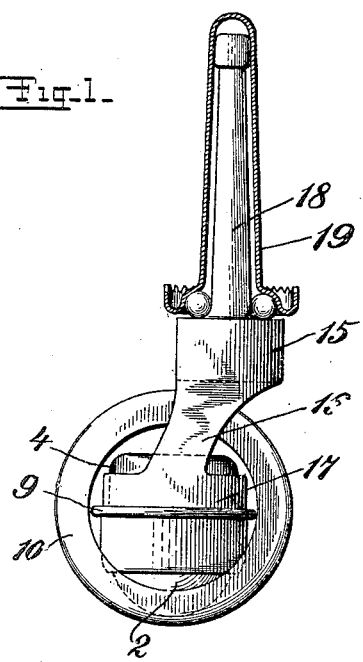
Figure 2:
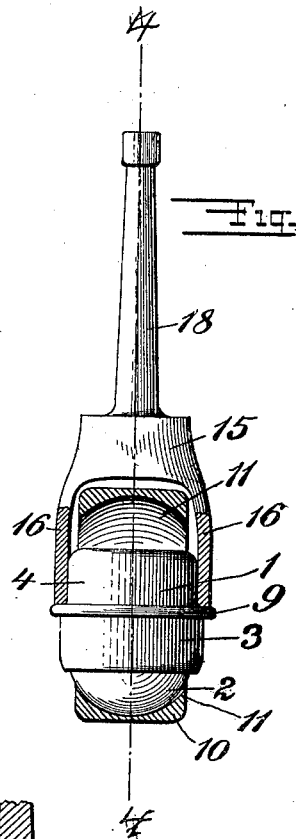
Figure 3:
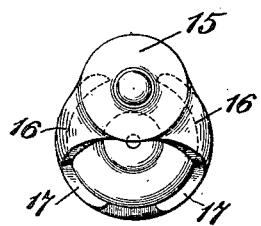
Figure 4:
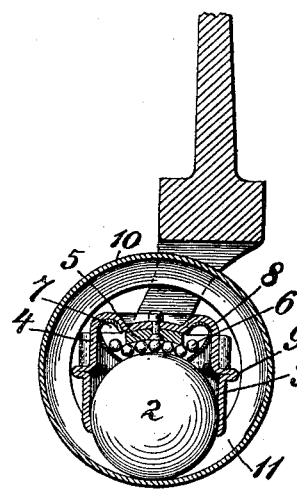

Referring to the drawings, Figure 1 represents a side elevation of a caster constructed according to my invention. Fig. 2 is a front elevation of the same, certain parts being in section. Fig. 3 is a plan view of the same with the auxiliary bearing-surface or track removed, and Fig. 4 is a vertical central section taken on the line 4 4 of Fig. 2.

Like reference-numerals refer to like parts wherever they appear in the several views.

Referring to the drawings in detail, 1 represents the casing of a ball-caster, which casing is preferably of such construction that the main bearing-ball 2 is free to rotate or roll over a floor or other surface in all directions. This caster is preferably constructed in accordance with the invention of Francis P. Magoun, as set forth in his application for Letters Patent, No. 19,009, filed June 4, 1900. As shown, this caster comprises a casing 1, drawn from a single piece of sheet metal, having a lower cylindrical part 3, through the lower open end of which the main bearing-ball 2 projects, so as to make contact with the surface upon which it rolls. Within the upper cylindrical part 4 of the casing a bearing-surface 5 is provided, between which and the main bearing-ball is located a series of smaller antifriction-balls 6. The bearing-surface 5 is concave and of such curvature that when it is spaced from the main bearing-ball by the antifriction-balls 6 it is substantially concentric with the surface of the bearing-ball. An annular relief-chamber 7 surrounds the bearing-surface 5 and communicates at its lower portion with the space between the bearing-surface 5 and the bearing-ball 2. The distance between the walls of this relief-chamber 7 is materially greater than the diameter of the antifriction-balls, so that the balls are free to travel around this chamber from one point of the surface of the bearing-ball to another point of the surface thereof, as is required to maintain between the bearing-ball 2 and the bearing-surface 5 always a sufficient number of the antifriction-balls to provide a universal antifriction-bearing for the main bearing - ball. As shown, the annular chamber is formed by an auxiliary casing 8, which is held in place by the inner walls of the casing 1 and acts to cover or bridge over all undesirable recesses or openings in the main casing and forms a ball-guiding surface having the necessary smooth surface of the desired conformation. Between the upper cylindrical part 4 of the casing 1 and the lower cylindrical part 3 a lateral flange 9 is provided, the upper surface of which forms a shoulder adapted to engage a suitable socket to which the caster is secured.

In the embodiment of my invention shown the auxiliary track provided for the caster to roll upon comprises a ring 10, which is slightly larger in diameter than the longest dimensions of the caster-body, so that the caster can be located within the same, as shown. The inner surface of the ring is preferably concave in transverse outline, and the transverse curvature of this annular surface is slightly greater in radius than the radius of the bearing-ball. The diameter of the outer surface of the ring 10 is much greater than the diameter of the bearing-ball 2, and said outer surface is preferably substantially cylindrical, as shown. By this construction it will be seen that the surface of the caster which comes in contact with the floor is an elongated or lineal area or surface instead of a point or a small circular area, as in the case of a spherical bearing-surface. It will also be noted that by giving the inner concave annular surface 11 the proper curvature a transverse lineal area of the bearing-ball may be brought into contact with said surface 11, the contact-pressure between these parts being thus greatly reduced. By this construction, also, the ring 10 is always kept in its proper operative position without the necessity of any special guiding or retaining means. This results from the fact that the ring 10 is always in its proper position when the ball is at the lowest point in the curved surface 11, and as the surface 11 curves upwardly in every direction from its lowest point the ball will always rest in that position. If the caster is rolled in any direction except at right angles to the axis of the ring 10, the ball 2 will tend to roll upwardly on one side of the ring far enough to change the direction of the movement of the ring, so that it will roll in the proper direction. If, however, the caster is moved in a direction exactly parallel to the axis of the ring 10, there will be no advancing movement of the ring, and consequently no tendency for it to turn so as to roll in the proper direction. To meet this contingency, the caster is mounted on a vertical spindle, which is located to one side of a vertical line drawn from the bearing-point of the caster, as in the ordinary roller-caster, so that when the furniture is moved in a direction parallel to the axis of the ring 10 the caster as a whole will swing into line with the desired direction of movement. Unlike the ordinary roller-caster, however, the first part at least of the movement of the caster upon its vertical axis takes place upon the universal antifriction-bearing formed by the antifriction-balls 6 between the ball 2 and surface 5, instead of upon the transverse lineal bearing area formed by the cylindrical surface of the roller. The caster starts to swing on its vertical axis, therefore, very easily, and since it starts to roll as soon as it has swung out of the parallel position referred to the ring 10 very readily turns into the proper position to roll in the direction desired.

For the purpose of providing a vertical axis upon which the caster is free to swing a pintle member 15 is used. The member 15 is provided with the downwardly and laterally extending arms 16, having the curved socket-forming extensions 17, adapted to embrace the upper cylindrical portion 4 of the casing 1 and rest on the shoulder formed by the flange 9. A space is left between the adjacent ends of the extensions 17 to permit of the ring 10 being inserted in its place, the ball-caster 1 being put in its place after the ring 10 has been inserted. The member 15 is provided with a vertical pintle 18, which is offset a suitable distance from the vertical line drawn from the bearing-point of the caster, as shown. This pintle 18 may be of ordinary construction, and it may be journaled in an ordinary socket, such as that indicated by the numeral 19.

My invention in its broader aspect is not limited to the precise construction shown nor to the particular construction by which it may be carried into effect, as many changes may be made in the construction without departing from the principles of my invention or sacrificing the advantages thereof.

What I claim as new, and desire to secure by Letters Patent, is—

1. The combination with a caster-body and a bearing-ball mounted therein so as to be free to rotate in all directions, of a bearing-ring surrounding said caster-body, said ring being adapted to form a track for said bearing-ball to roll upon, substantially as described.

2. The combination with a caster-body and a bearing-ball mounted therein so as to be free to rotate in all directions, of a bearing-ring surrounding said caster-body, said ring having an annular concave inner surface adapted to form a track for said bearing-ball to roll upon, substantially as described.

3. The combination with a caster-body and a bearing-ball mounted therein so as to be free to rotate in all directions, of a bearing-ring surrounding said caster-body, said ring having a substantially cylindrical outer surface and an annular concave inner surface adapted to form a track for said bearing-ball to roll upon, substantially as described.

4. The combination with a caster-body, a bearing-ball mounted therein, and a universal antifriction-bearing for said bearing-ball, of a bearing-ring surrounding said caster-body, said ring being adapted to form a track for said bearing-ball to roll upon, substantially as described.

5. The combination with a caster-body and a bearing-ball mounted therein so as to be free to rotate in all directions, of a socket for said caster-body having a pintle eccentrically arranged with reference to the vertical axis of the caster, an annular bearing-surface concentric with the pintle, a socket-piece within which said pintle is free to rotate, said socket-piece having an annular bearing-surface, antifriction-balls located between said annular bearing-surfaces, and a bearing-ring surrounding said caster-body, said ring being adapted to form a track for said bearing-ball to roll upon, substantially as described.

6. The combination with a caster-body and a bearing-ball mounted therein so as to be free to rotate in all directions, of a socket for said caster-body having a pintle arranged to one side of but parallel with the vertical axis of the caster, and a bearing-ring surrounding said caster-body, said ring being adapted to form a track for said bearing-ball to roll upon, substantially as described.

7. The combination with a caster-body and a bearing-ball mounted therein so as to be free to rotate in all directions, of a socket for said caster-body having a pintle arranged to one side of but parallel with the vertical axis of the caster, and a bearing-ring surrounding said caster-body, said ring having an annular concave inner surface adapted to form a track for said bearing-ball to roll upon, substantially as described.

8. The combination with a caster-body, a bearing-ball mounted therein, and a universal antifriction-bearing for said bearing-ball, of a socket for said caster-body having a pintle arranged to one side of but parallel with the vertical axis of the caster, and a bearing-ring surrounding said caster-body, said ring being adapted to form a track for said bearing-ball to roll upon, substantially as described.

9. The combination with a caster-body, a bearing-ball mounted therein, and a universal antifriction-bearing for said bearing-ball, of a socket for said caster-body having a pintle arranged to one side of but parallel with the vertical axis of the caster, and a bearing-ring surrounding said caster-body, said ring having a substantially cylindrical outer surface and an annular concave inner surface adapted to form a track for said bearing-ball to roll upon, substantially as described.

In testimony whereof I have signed my name to this specification in the presence of two subscribing witnesses.

GEORGE B. MAGOUN.

Witnesses:
J. H. FREEMAN,
EDWIN SEGER.